United States Patent
Santori et al.

(10) Patent No.: US 8,554,831 B2
(45) Date of Patent: Oct. 8, 2013

(54) SYSTEM AND METHOD FOR EXECUTING HANDS-FREE OPERATION OF AN ELECTRONIC CALENDAR APPLICATION WITHIN A VEHICLE

(75) Inventors: Nello Joseph Santori, Canton, MI (US); Micah J. Kaiser, Westland, MI (US); Joseph N. Ross, Ypsilanti, MI (US); David P. Boll, Grosse Pointe Park, MI (US); Brian Woogeun Joh, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 570 days.

(21) Appl. No.: 12/476,290

(22) Filed: Jun. 2, 2009

(65) Prior Publication Data

US 2010/0306309 A1 Dec. 2, 2010

(51) Int. Cl.
*G06F 15/16* (2006.01)

(52) U.S. Cl.
USPC .... 709/203; 455/66.1; 455/456.1; 455/456.4; 719/328

(58) Field of Classification Search
USPC .......................................... 709/203; 719/328
See application file for complete search history.

(56) References Cited

U.S. PATENT DOCUMENTS

| | | | |
|---|---|---|---|
| 6,526,335 B1 | 2/2003 | Treyz et al. | |
| 7,207,041 B2 | 4/2007 | Elson et al. | |
| 7,266,435 B2 | 9/2007 | Wang et al. | |
| 7,505,784 B2 | 3/2009 | Barbera | |
| 7,602,782 B2 | 10/2009 | Doviak et al. | |
| 7,801,941 B2 | 9/2010 | Conneely et al. | |
| 2002/0098853 A1 | 7/2002 | Chrumka | |
| 2003/0079123 A1 | 4/2003 | Mas Ribes | |
| 2003/0147534 A1 | 8/2003 | Ablay et al. | |
| 2004/0203660 A1 | 10/2004 | Tibrewal et al. | |
| 2004/0260438 A1 | 12/2004 | Chernetsky et al. | |
| 2004/0267585 A1 | 12/2004 | Anderson et al. | |
| 2005/0091408 A1* | 4/2005 | Parupudi et al. | 709/246 |
| 2005/0177635 A1 | 8/2005 | Schmidt et al. | |
| 2006/0150197 A1 | 7/2006 | Werner | |
| 2006/0156315 A1 | 7/2006 | Wood et al. | |
| 2006/0190097 A1 | 8/2006 | Rubenstein | |
| 2006/0287787 A1 | 12/2006 | Engstrom et al. | |

(Continued)

OTHER PUBLICATIONS

Kermit Whitfield, "A hitchhiker's guide to the telematics ecosystem", Automotive Design & Production, Oct. 2003, http://findarticles.com, pp. 1-3.

(Continued)

*Primary Examiner* — Tauqir Hussain
(74) *Attorney, Agent, or Firm* — Jennifer Stec; Brooks Kushman P.C.

(57) ABSTRACT

One or more embodiments may include a method and system for operating a computer application stored on a nomadic device (ND) located within the vicinity of a vehicle. The system may include a vehicle computer system (VCS). The method may include receiving an input at the VCS to pair the VCS with the ND to establish a wireless communication link over which the VCS may receive one or more instructions from the ND. The one or more instructions may include instructions for establishing a connection with an electronic calendar application executing on the ND and instructions for prompting a user for one or more electronic calendar application events. The method may further include receiving a request from the user for the one or more electronic calendar application events and executing the one or more electronic calendar application events.

15 Claims, 4 Drawing Sheets

(56) References Cited

U.S. PATENT DOCUMENTS

| | | | |
|---|---|---|---|
| 2006/0287821 | A1 | 12/2006 | Lin |
| 2007/0016362 | A1* | 1/2007 | Nelson .................... 701/200 |
| 2007/0042809 | A1 | 2/2007 | Angelhag |
| 2007/0042812 | A1 | 2/2007 | Basir |
| 2007/0050854 | A1 | 3/2007 | Cooperstein et al. |
| 2007/0132572 | A1 | 6/2007 | Itoh et al. |
| 2007/0294625 | A1 | 12/2007 | Rasin et al. |
| 2008/0086455 | A1* | 4/2008 | Meisels et al. ............... 707/3 |
| 2008/0148374 | A1 | 6/2008 | Spaur et al. |
| 2008/0220718 | A1 | 9/2008 | Sakamoto et al. |
| 2008/0313050 | A1* | 12/2008 | Basir .......................... 705/26 |
| 2009/0075624 | A1 | 3/2009 | Cox et al. |
| 2009/0106036 | A1* | 4/2009 | Tamura et al. ................ 705/1 |
| 2009/0117890 | A1 | 5/2009 | Jacobsen et al. |
| 2009/0228908 | A1 | 9/2009 | Margis et al. |
| 2009/0253466 | A1 | 10/2009 | Saito et al. |
| 2009/0318119 | A1* | 12/2009 | Basir et al. ................. 455/413 |
| 2010/0063670 | A1 | 3/2010 | Brzezinski et al. |
| 2010/0094996 | A1 | 4/2010 | Samaha |
| 2010/0098853 | A1 | 4/2010 | Hoffmann et al. |
| 2010/0216509 | A1 | 8/2010 | Riemer et al. |
| 2010/0234071 | A1 | 9/2010 | Shabtay et al. |
| 2011/0105097 | A1 | 5/2011 | Tadayon et al. |
| 2011/0112762 | A1 | 5/2011 | Gruijters et al. |

OTHER PUBLICATIONS

International Searching Authority, International Search Report for the corresponding PCT Application No. PCT/US2010/37052 mailed Sep. 17, 2010.

Ford Motor Company, "SYNC with Navigation System," Owner's Guide Supplement, SYNC System Version 1 (Jul. 2007).

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "Navigation System: SYNC," Owner's Guide Supplement, SYNC Version 3 (Jul. 2009).

Ford Motor Company, "SYNC," Owner's Guide Supplement, SYNC Version 3 (Aug. 2009).

Narasimhan, et al., A lightweight remote display management protocol for mobile devices, Application Research Center, Motorola Labs Schaumburg, IL, 2007, pp. 711-715.

Voelcker, Top 10 Tech Cars It's the Environment, Stupid, www.Spectrum.IEEE.org, Apr. 2008, pp. 26-35.

Yarden, et al., Tuki: A Voice-Activated Information Browser, IEEE, 2009, pp. 1-5.

Gil-Castineira, et al., Integration of Nomadic Devices with Automotive User Interfaces, IEEE Transactions on Consumer Electronics, vol. 55, No. 1, Feb. 2009.

Nusser, et al., Bluetooth-based Wireless Connectivity in an Automotive Environment, Robert Bosch GmbH, VTC 2000, pp. 1935-1942.

Antuan Goodwin, The Car Tech Blog, Ford Unveils open-source Sync developer platform, http://reviews.cnet.com/8301-13746_7-10385619-48.html, Oct. 2009, pp. 1-5.

Service Discovery Protocol (SDP) Layer Tutorial, Palowireless Bluetooth Research Center, http://www.palowireless.com/infotooth/tutorial/sdp.asp. Aug. 3, 2010.

IPhone Hacks, Apple Files Patent Which Allow You to Control Your Computer Remotely Using IPhone, http://www.iphonehacks.com/2009/12/apple-files-patent-which-could-allow-you-to-control-your-computer-remotely-sing-iphone, Jun. 22, 2010.

Zack Newmark, American, Concept Car, Ford, Gadgets, Lifestyle, Technology, Student develop in-car cloud computing apps; envision the future of in-car connectivity, May 4, 2010, http://www.woldcarfans.com/print/110050425986/student-develop-in-car-cloud-computing_apps;_envision_the_future_of_in-car_connectivity.

Darryl Chantry, MSDN, Mapping Applications to the Cloud, 2010 Microsoft Corporation, Platform Architecture Team, Jan. 2009, http://msdn.microsoft.com/en-us/library/dd430340(printer).aspx, Jun. 18, 2010.

Wikipedia, the free encyclopedia, X Window System, http://en.wikipedia.org/wiki/X_Window_System, Jun. 22, 2010.

"MobileSafer is your personal safe driving assistant", 2010 ZoomSafer Inc. <http://zoomsafer.com/products/mobilesafer> Dec. 28, 2010.

"How PhonEnforcer Works" Turn Off the Cellphone While Driving-PhonEnforcer. Turn Off the Cell Phone LLC. <http://turnoffthecellphone.com/howitworks.htm> Dec. 28, 2010, pp. 1-3.

"PhonEnforcer FAQ's" Turn Off the Cellphone While Driving-PhonEnforcer. Turn Off the Cell Phone LLC. <http://turnoffthecellphone.com/faq.html> Dec. 28, 2010, pp. 1-2.

Lamberti, Ralph "Daimler Full Circle: The Rise of Vehicle-Installed Telematics-Telematics Munich 2009" Nov. 10, 2009.

* cited by examiner

Fig-4

SYSTEM AND METHOD FOR EXECUTING HANDS-FREE OPERATION OF AN ELECTRONIC CALENDAR APPLICATION WITHIN A VEHICLE

BACKGROUND

1. Technical Field

Various embodiments include a method and system for executing hands-free operation of an electronic calendar application. More particularly, the various embodiments include executing hands-free operation of an electronic calendar application within a vehicle.

2. Background

Typically, applications stored on a portable device (such as a mobile phone) require tactile commands to accomplish one or more operations of the application. For example, if a user desires to operate an internet radio on his or her portable device, he or she may be required to physically input which stations and/or genres of music they want to listen to from his or her portable device keypad. An exemplary internet radio application known in the art is the Pandora application distributed by Pandora Media, Inc. As another example, if a user desires to operate his or her electronic calendar from a mobile device, he or she may be required to do so through text-based inputs, outputs, and commands. For example, if a user wants to add an appointment to the calendar, he or she may manually input the appointment using the mobile device's key pad.

Furthermore, applications on a portable device may require the user to visually receive outputs from the application in order to operate the application. In certain environments, however, such as while driving a vehicle, operating the application in the manner described above may not only be difficult, but also be unsafe for the driver. Accordingly, what is desired is a way for a user to operate one or more applications from a portable device using hands-free access in order to enable safe driving for the user.

An electronic calendar application is an exemplary application which a user may desire to operate using hands-free accessibility from his or her portable device. One exemplary environment in which a user may want to operate the electronic calendar application is in his or her vehicle equipped with the SYNC communications system manufactured and distributed by the Ford Motor Company.

SUMMARY

One aspect may include a computer-implemented method for operating a computer application stored on a nomadic wireless communication device (ND) located within the vicinity of a vehicle. The method may include receiving input at a vehicle computer system (VCS) to pair the VCS with the ND to establish a wireless communication link between the VCS and the ND.

One or more first instructions from the ND may be received at the VCS over the wireless communication link. The one or more first instructions may include instructions for establishing a connection with an electronic calendar application executing on the ND and instructions for prompting a user for one or more electronic calendar application events. The one or more first instructions may further include instructions for disconnecting the connection between the electronic calendar application and the VCS. The method may further include receiving at the VCS a request from the user for the one or more electronic calendar application events and executing the one or more electronic calendar application events.

In some embodiments, the one or more electronic calendar application events maybe be executed by the ND and executing the one or more electronic calendar application events may include speaking the one or more electronic calendar application events executed by the ND.

In some embodiments, executing the one or more electronic calendar application events may include transmitting one or more messages to the ND to execute the one or more electronic calendar application events according to the request. The one or more electronic calendar application events may include at least one of outputting one or more appointments, deleting one or more appointments, adding one or more appointments, modifying one or more appointments, moving between one or more appointments, and terminating operation of the electronic calendar application.

The method may further include utilizing an application programming interface (API) to establish a connection between the VCS and the electronic calendar application executing on the ND to transmit data between the VCS and the electronic calendar application.

In some embodiments, executing the one or more electronic calendar application events may further include receiving one or more second instructions from the electronic calendar application executing on the ND. The one or more second instructions may include instructions for speaking textual information issued from the electronic calendar application. The textual information may include at least one of a connection confirmation, information associated with one or more appointments, and an appointment deletion confirmation. The textual information may further include operating instructions for operating the electronic calendar application.

In some embodiments, the first instructions or second instructions may further include at least one additional instruction associated with a completion of an operation performed by the one or more first instructions or the one or more second instructions. The method may further include transmitting an identifier and the at least one additional instruction to the electronic calendar application executing on the ND. The identifier may identify the completion of the operation performed by the one or more first instructions or the one or more second instructions.

In some embodiments, the method may further include receiving at the VCS a request from the user to operate the electronic calendar application executing on the ND. The request from the user may be in response to a trigger in the vehicle. The trigger may be a button press, a voice-activated trigger, or both.

Another aspect may include a computer-implemented system for operating a computer application stored on a nomadic wireless communication device (ND) within the vicinity of a vehicle. The system may include a vehicle computer system (VCS). The VCS may be configured to pair with the ND to establish a wireless communication link between the VCS and the ND. The VCS may be further configured to receive an input in order to pair with the ND for wireless communication. The VCS may be additionally configured to receive one or more first instructions from the ND over the wireless communication link. The one or more first instructions may include instructions for establishing a wireless connection with an electronic calendar application executing on the ND and instructions for prompting a user for one or more electronic calendar application events.

The VCS may be further configured to receive a request from the user for the one or more electronic calendar application events. The VCS may be additionally configured to execute the one or more electronic calendar application events. The VCS may execute the one or more electronic calendar application events by transmitting one or more messages to the ND to execute the one or more electronic calendar application events according to the request.

In some embodiments, the VCS may be further configured to receive one or more second instructions from the ND. The one or more second instructions may include instructions for speaking textual information issued from the electronic calendar application.

In some embodiments, the first instructions or second instructions may further include at least one additional instruction associated with a completion of an operation performed by the one or more first instructions or the one or more second instructions. The VCS may be further configured to transmit an identifier and the at least one additional instruction to the electronic calendar application. The identifier may identify the completion of the operation performed by the one or more first instructions or the one or more second instructions.

Another aspect may include a computer implemented system for operating a computer application stored on a ND located within the vicinity of a vehicle. The system may include a means for receiving input at a vehicle computer system (VCS) to pair the VCS with the ND. The pairing may establish a wireless communication link between the VCS and the ND. The system may additionally include a means for receiving a request from a user for operating an electronic calendar application executing on the ND.

The system may further include a means for receiving at the VCS one or more first instructions from the NWCD over the wireless communication link. The one or more first instructions may include instructions for establishing a connection with the electronic calendar application and instructions for prompting the user for one or more electronic calendar application events. The system may further include a means for receiving at the VCS a request from the user for the one or more electronic calendar application events and a means for executing the one or more electronic calendar application events. In one embodiment, the means for executing may include transmitting one or more messages to the ND to execute the one or more electronic calendar application events according to the request.

These and other aspects of the present invention will be better understood in view of the attached drawings and following detailed description of the invention.

BRIEF DESCRIPTION OF THE DRAWINGS

Features of the present invention which are believed to be novel are set forth with particularity in the appended claims. The present invention, both as to its organization and manner of operation, together with further object and advantages thereof, may best be understood with reference to the following description, taken in connection with the accompanying drawings, which:

DETAILED DESCRIPTION OF THE VARIOUS EMBODIMENTS

Detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Mobile devices today are more than just a communication vehicle for users. Mobile devices may be equipped with features that provide the user the benefit of engaging in activities that may traditionally have been performed through other means. With mobile devices becoming an integral part of society, users want uninterrupted access to their device's services and features. The difficulty and concern with such access occurs when the user is driving a vehicle. Drivers, in particular, cannot be distracted from focusing on their driving.

For example, drivers may want to access certain application on their phone such as audio files, text messages, and their electronic calendar to name a few. Typically, a user may be required to physically operate his or her mobile device in order to retrieve these applications. This may not only create a hazard for the driver and/or passenger, but may create a hazard for others on the road as well.

Some mobile devices provide an electronic calendar application. An electronic calendar allows a user to operate a calendar for the same purposes as a user would a non-electronic calendar, but the calendar is stored on, for example, the user's mobile device. The electronic calendar may require a user to physically operate the application through, for example, button presses. Furthermore, the electronic calendar may only have a visual interface, thus requiring the user to receive all outputs from the electronic calendar and submit all inputs through visual interaction with the application.

Accordingly, a method and system for executing hands-free operation of an electronic calendar application within a vehicle is presented in one or more embodiments. While various embodiments disclosed are presented in the context of operating an electronic calendar application within a vehicle, this is provided by way of example only. The present invention may be used within other types of environments in which the hands-free accessibility of other mobile device applications is desired.

Figure 1:
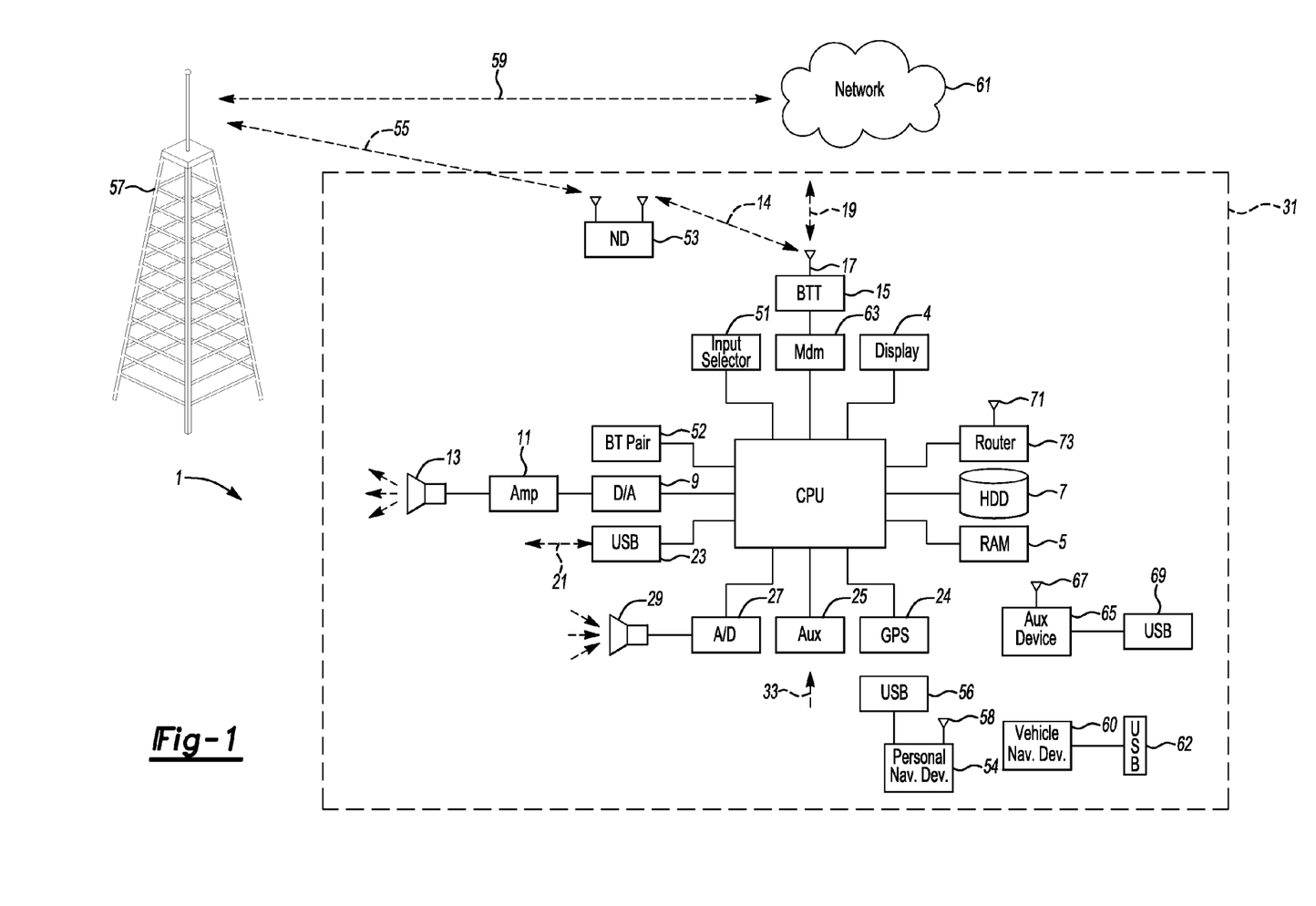
FIG. 1 illustrates an example block topology for a vehicle computer system 1 for enabling the execution of hands-free operation of an electronic calendar application within the vehicle.

FIG. 1 illustrates an example block topology for a vehicle computer system 1 (hereinafter referred to as VCS 1) for enabling, for example, the operation of an electronic calendar application from the vehicle. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system 1. Provided within the vehicle, the processor 3 allows onboard processing of commands and routines. Further, the processor 3 maybe connected to both non-persistent 5 and persistent storage 7. In this illustrative embodiment, the non-persistent storage is random access memory (RAM) and the persistent storage is a hard disk drive (HDD) or flash memory.

The processor 3 is also provided with a number of different inputs allowing the user to interface with the processor 3. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor 3.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 14 with a user's nomadic device 53 (e.g., cell phone, smart phone, PDA, etc.) (hereinafter referred to as ND 53) using BLUETOOTH antenna 17. The ND 53 can then be used to communicate 59 with a network 61 outside the vehicle 31 through, for example, communication 55 with a cellular tower 57.

Pairing a ND 53 and the BLUETOOTH transceiver 15 can be instructed through a button 52 or similar input, telling the CPU 3 that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 in order to transfer data between CPU 3 and network 61 over the voice band. In one illustrative embodiment, the processor 3 is provided with an operating system including an API to communicate with modem application software. The modem application software may access an embedded module or firmware on the BLUETOOTH transceiver to complete wireless communication with a remote BLUETOOTH transceiver (such as that found in a nomadic device). In another embodiment, ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is affixed to vehicle 31.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61.

Further, the CPU 3 could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU 3 to connect to remote networks in range of the local router 73.

Operation of one or more embodiments of the present invention will be described with respect to FIGS. 2 and 3. Upon pairing the ND 53 to the CPU 3 as in block 80, a user may request operation of the electronic calendar computer application (hereinafter referred to as the "Application") by triggering activation of the Application from the vehicle as in block 92. For example, a user may press a button on the vehicle steering wheel (e.g., a push-to-talk button) or speak a command to activate. In one embodiment, prior to receiving a request for the Application, the CPU 3 may establish a connection to one or more client-side APIs or applets executing on ND 53 using an application programming interface (API) as illustrated in block 82. The API is described below in greater detail with respect to FIG. 4.

The CPU 3 may establish a connection based on a trigger from the user (e.g., a button press, a voice command or both). For example, a user may press a push-to-talk button disposed on a steering wheel of the vehicle and then say "applications." The CPU 3 may include speech recognition software so that the CPU 3 may interpret and process instructions issued from a user. For example, the CPU 3 may receive instruction for establishing a connection with the ND 53 using the API. It should be understood that the speech recognition software may recognize other commands as described throughout this application and that the example provided is illustrative.

Using the API, the CPU 3 may then query the ND 53 to determine the applications present on the device for operation via CPU 3 as illustrated in block 84. The user may or may not then receive a prompt for another request. In either case, the user may then issue another request (e.g., through a button press and/or voice instruction) for one or more applications available on the ND 53. The CPU 3 may provide to the user (e.g., via a display 4 or in a spoken language outputted from speaker 13) the one or more applications available on the ND 53 as in block 84.

The requested Application may or may not be available on the ND 53 as in block 86. If the Application is not available, the user may be prompted that the Application is unavailable as illustrated in block 88. The user may be required to first download the Application from an external website or from the VCS 1 memory (e.g., HDD 7) prior to operating the Application. If the Application is available on the ND 53, the user may then operate the Application as described below.

In one embodiment, the user may "wake-up" the CPU 3 (e.g., through a button press or a voice command) prior to making a request for any application so that the user may operate applications via CPU 3.

If the Application is available on the ND 53 and when a request for activation of the Application is received by the CPU 3, the CPU 3 may then communicate a message to the ND 53 to activate or launch the requested Application on ND 53 as in block 90. The message may be translated into Unicode (e.g., UTF-8 or UTF-16) and transmitted to the ND 53. In one illustrative embodiment, the message may be translated into ASCII code.

Upon receiving the message from the CPU 3, the ND 53 may launch the Application as in block 90. Using the client-side API or applet, the Application may output a number of instructions to the CPU 3 for operating the Application as will be described in further detail below with respect to FIGS. 2 and 3. In one embodiment, the instructions may be in the extensible markup language (XML) format. Alternatively or additionally, the Application may directly output instructions from the ND 53 to the CPU 3 for accomplishing one or more operations of the various embodiments of the present invention.

In one embodiment, one or more of the operations/instructions may be synchronous or asynchronous. As used herein, an asynchronous operation may be one that runs until a return message is sent back to the Application indicating that the instruction is completed. In one embodiment, instructions relating to the operation and management of the Application may be transmitted and executed before the Application receives the completion instruction.

The instructions to perform the operation may be in the form of "procedure(parameter)" wherein "procedure" may define the task or event to be performed and "parameter" may define the one or more arguments that the procedure may accept to perform the task or event. It should be understood that this format is exemplary and, therefore, non-limiting, such that other formats may be used for achieving one or more operations described below.

Figure 2:
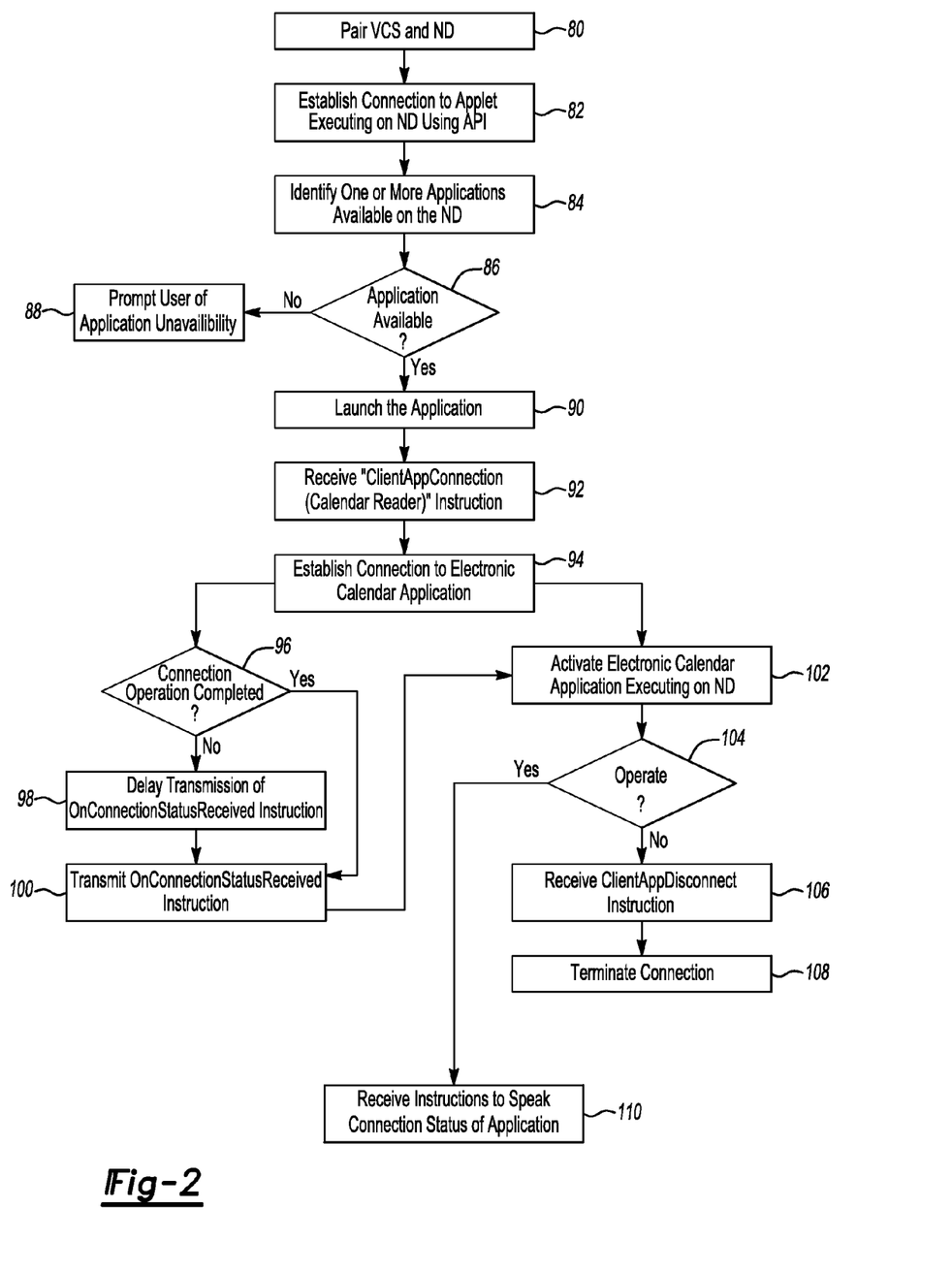
FIG. 2 illustrates the operation of executing the hands-free operation of an electronic calendar application within a vehicle according to one of the various embodiments of the present invention.
Figure 3:
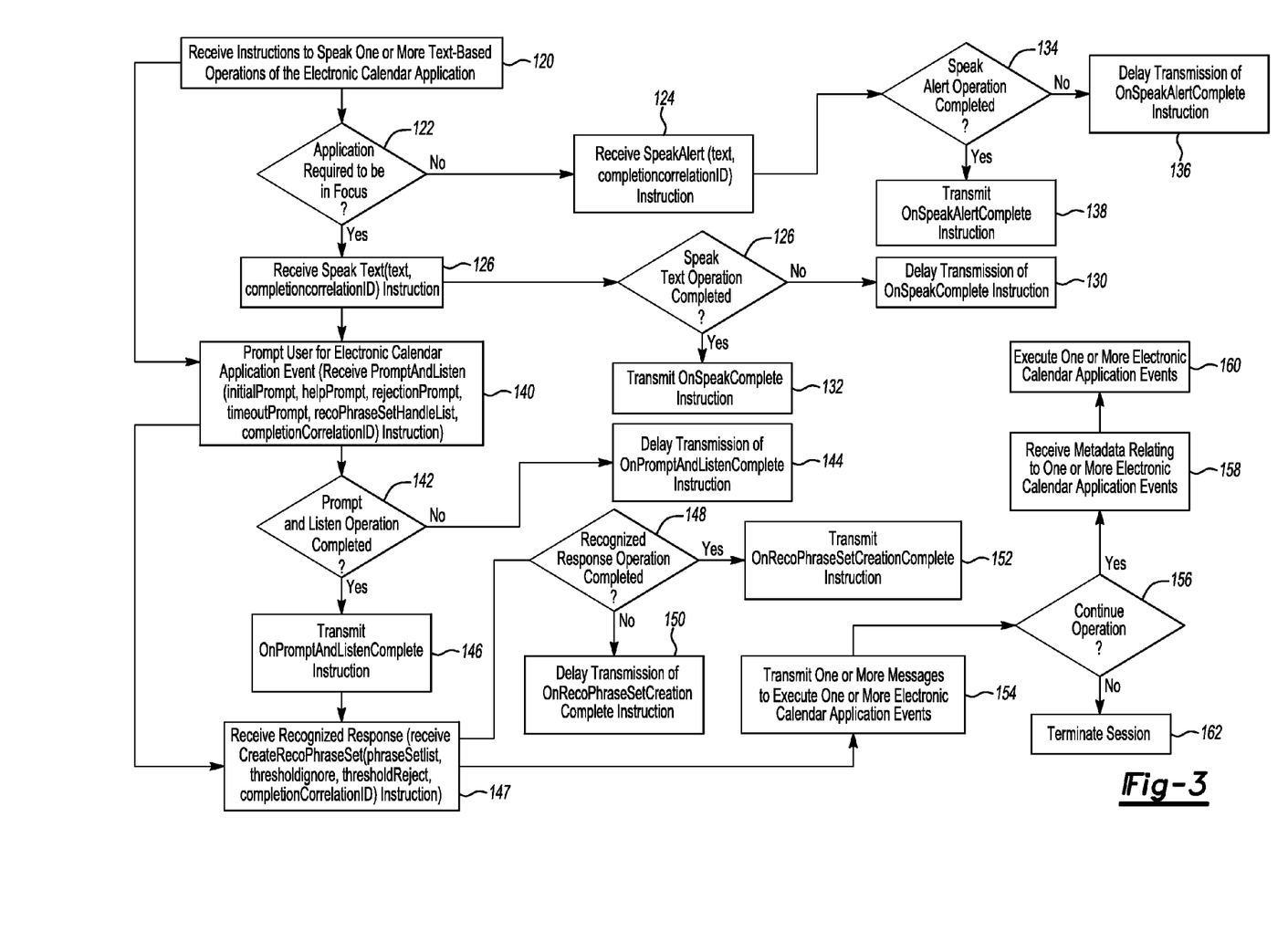
FIG. 3 illustrates the operation of executing the hands-free operation of an electronic calendar application within a vehicle according to another one of the various embodiments of the present invention.

With additional reference to FIG. 3, upon receiving one or more messages from the CPU 3, the application may transmit an instruction to connect with the CPU 3 as in block 92 (FIG. 2). One exemplary instruction may be "ClientAppConnect (appName)." A connection may be established as illustrated in block 94.

"AppName" may identify the application to be operated. Thus, for example, if the application is an internet radio application (e.g., such as "Pandora" manufactured and distributed by Pandora Media, Inc.), the instruction may be written as "ClientAppConnect(Pandora)." If the application is an appointment reader, the syntax may be "ClientAppConnect(CalendarReader)." In one embodiment, the application may receive a return instruction identifying a connection status (e.g., a completed connection) with the CPU 3. An exemplary return instruction may be "OnConnectionStatusReceived." CPU 3 may determine whether the connection operation is complete as in block 96. If the connection operation is not complete, then CPU 3 may delay transmission of the OnConnectionStatusReceived instruction as illustrated in block 98. If the connection operation is complete, then CPU 3 may transmit the instruction to the Application as in block 100.

The application may also receive a unique identification (ID) number representing the connection status with the CPU 3. The ID may only be valid for the duration of the connection (i.e., until the connection is disconnected).

After a connection has been made with the CPU 3, the Application may be activated and operated through the CPU 3 after launching the electronic calendar application as in block 102. Establishing a connection may include establishing a connection to the Application over a communication network (e.g., the Internet).

A user may have the option to disconnect operation of the Application at any time as illustrated in block 104. If the user chooses to disconnect use of the Application, he or she may speak a command to exit the Application. One or more messages may be transmitted from the CPU 3 to the ND 53 for disconnecting the electronic calendar session. In response, a disconnect instruction may be received by CPU 3 as in block 106. An instruction to disconnect with the CPU 3 may be represented by "ClientAppDisconnect." Accordingly, once the connection to the CPU 3 is terminated, any further communication by the Application to the CPU 3 using the same connection may be ignored as in block 108.

If the user chooses not to disconnect, CPU 3 may receive instructions from ND 53 to speak the connection status to operate the Application as in block 110. Operation of the application may be accomplished through a text-to-speech (TTS) and/or a speech-to-text (STT) conversion. For example, when a user desires to use the Application (and other applications that may be on his or her ND 53), he or she may issue a voice-activated command to activate the Application which may be received by microphone 29. A module in the CPU 3 may include computer-executable instructions for converting the speech into text. The text may then be communicated (e.g., in ASCII code) to the client-side API or applet in the ND 53 for activating the requested Application. The Application may then be activated upon receiving the instructions from the client-side API.

The ND 53 may then issue a return command to the CPU 3 to speak the requested Application signaling to the user that the requested Application has been identified as in block 120 (FIG. 3). The return command may be generated from the Application as text. Accordingly, an instruction may be issued by the Application to speak the specified text to the user as in block 120. For example, if the user requests the electronic calendar application, the Application (through the ND 53) may then transmit an instruction to the CPU 3 to say, for example, "Calendar Reader". Such a message may be displayed on the visual interface of the ND 53 (if operating the Application through the ND 53). Using one or more embodiments of the present invention, however, the text maybe converted to speech.

One syntax example of a return instruction may be "SpeakText(text,completionCorrelationID)" (hereinafter referred to as the "speak text instruction"). The instruction may include an additional instruction to identify the completion of the event (i.e., speaking the text) as in block 128. One syntax example of such an instruction may be "OnSpeakComplete." CPU 3 may determine whether the speak text operation is complete. If CPU 3 determines that the operation is not complete, CPU 3 may delay transmission of the OnSpeakComplete instruction as illustrated in block 130. If the connection operation is complete, then CPU 3 may transmit the instruction to the Application as in block 132.

The speak text instruction may be used to speak the specified text through the VCS 1 speakers 13. SpeakText may represent the event that is to occur, "text" may represent the text to be spoken by the CPU 3 through VCS 1, and "completionCorrelationID" may represent an identifier to be returned upon completion of the event. The identifier may be sent with the "OnSpeakComplete" event.

In one embodiment, in order for the speak text instruction to be completed, the Application may or may not be required to be "in focus" as in block 122. Thus, for example, for the user to receive the message, "Calendar Reader," from the VCS 1, the system may be programmed to ensure that the Application is the one with which the user is interacting at that time. In instances where the system may be programmed so that Application does not need to be "in focus," the application may issue the same or a separate instruction.

One example of a separate instruction may be "speakAlert (text,completionCorrelationID)" (hereinafter referred to as the "speak alert instruction") which may be received by CPU 3 if the Application is not required to be in focus as in block 124. If the Application is required to be in focus, then the speak text instruction may be received as in block 126. The speak alert instruction may be asynchronous and include the instruction "OnSpeakAlertComplete" to signify the completion of the speak text instruction event to the Application. CPU 3 may determine whether the speak alert operation is complete as in block 134. If the operation is not complete, then CPU 3 may delay transmission of the OnSpeakAlertComplete instruction as illustrated in block 136. If the connection operation is complete, then CPU 3 may transmit the instruction to the Application as in block 138.

It should be understood that the speak text instruction may be issued when connecting to the Application and during operation of the Application. Thus, it is not only limited to launching the Application. It may be used for commanding operation of the Application.

For example, the CPU 3 may receive from the Application instructions to provide one or more electronic calendar events that can be played to the user from the CPU 3 through VCS 1. These electronic calendar events may then be presented to the user using the speak text instructions. For example, an instruction issued from the Application may cause the CPU 3 to say the nearest upcoming appointment if the user requests, for example, the next appointment provided in the calendar. The user's request may be received by microphone 29 and transmitted to the CPU 3. The CPU 3 may then transmit one or more messages (e.g., in ASCII code) to the client-side API or applet on ND 53 to cause the Application to launch one or more appointments and output the appointments to the user for playback through speaker 13.

Other non-limiting voice commands for operating the Application may include commands for playing all appointments (e.g., "play all"), play current appointments, (e.g. "play today"), play future appointments (e.g., "play tomorrow"), delete appointments (e.g., "delete appointment), terminating operation of the application (e.g. "exit"), adding an appointment, and modifying appointments. In one embodiment, if a user wishes to delete an appointment, an instruction may be sent from the Application to the CPU 3 to output a confirmation through VCS 1 for the user to accept or reject the deletion.

The CPU 3 may prompt the user for commands to operate the Application as in block 140. For example, a user may hear "Please say a command". Another non-limiting prompt may be the deletion confirmation prompt as described above. One or more of these prompts may include a plurality of parameters. One exemplary instruction may be for prompting the user and listening for a recognized response. As will be described below, the recognized responses may be based on additional instructions programmed to the module. The prompting instructions and the recognizing response instructions may have a particular syntax. For example, one exemplary syntax may be "PromptAndListen (initialPrompt, helpPrompt, rejectionPrompt, timeoutPrompt, recoPhraseSetHandleList, completionCorrelationID) (hereinafter referred to as the "prompt instruction"). This instruction may be associated with an additional instruction signifying the completion of this event. An exemplary syntax of such an instruction may be "OnPromptAndListenComplete." CPU 3 may determine whether the prompt and listen operation is complete as in block 142. If the operation is not complete, then CPU 3 may delay transmission of the OnPromptAndListenComplete instruction as illustrated in block 144. If the prompt and listen operation is complete, then CPU 3 may transmit the instruction to the Application as in block 146.

"PromptAndListen" of the prompt instruction may represent the occurring event (i.e., prompt and listen). "initialPrompt" may include the text to be spoken to the user before listening starts. "helpPrompt" may include the text to be spoken to the user if he or she asks for help during a listening event. "rejectionPrompt" may include text to be spoken to a user if he or she fails to speak a recognizable phrase. "timeoutPrompt" may include the text to be spoken to the user if he or she fails to speak a recognizable phrase. "recoPhraseSetHandleList" may include a number of phrase set handles (or phrase set identifiers) created during the event session for recognizing one or more pre-programmed phrases. In one embodiment, any recognized phrases may be returned to the application using the "OnPromptAndListenComplete" instruction. The return instruction may also include an identifier included in the "completionCorrelationID" instruction event.

Recognizing the responses listened for by the CPU 3 upon outputting a prompt may be accomplished through a number of further instructions as in block 147. These instructions may create a set of phrases that can be listened for during a "PromptAndListen" operation. An exemplary syntax of such an instruction may be "CreateRecoPhraseSet(phraseSetList, thresholdIgnore, thresholdReject, completionCorrelationID)" (hereinafter referred to as the "recognized response instruction"). The recognized response instruction may be associated with an additional instruction to signify the completion of the recognized response event. An exemplary return instruction may be "OnRecoPhraseSetCreationComplete." The return instruction may include a phrase set identifier (i.e., handle) for use with subsequent prompt instructions. CPU 3 may determine whether the recognized response operation is complete as in block 148. If the operation is not complete, then CPU 3 may delay transmission of the OnRecoPhraseSetCreationComplete instruction as illustrated in block 150. If the recognized response operation is complete, then CPU 3 may transmit the instruction to the Application as in block 152.

"CreatRecoPhraseSet" of the recognized response instruction may represent the phrase set creation event used for recognition. "phraseSetList may include a number of phrase strings to be recognized by the CPU 3. "thresholdIgnore" may include a numeric value between a predetermined range (e.g., between 0 and 100) indicating the recognition confidence level to be attained for a response (i.e., phrase) from the user to not be ignored. "thresholdReject" may include a numeric value between a predetermined range (e.g., between 0 and 100) indicating the recognition confidence level to be attained for a response (i.e., phrase) from the user to not be rejected. "completionCorrelationID" may be an identifier included in the "OnRecoPhraseSetCreationComplete" instruction which may signify completion of a phrase-set creation operation.

Upon receiving a request for the electronic calendar application event, the CPU 3 may then transmit one or more messages (e.g., in ASCII code) to the client-side API or applet causing the Application to execute the electronic calendar application event as in block 154. For example, if the user requests "appointments," the Application may launch electronic calendar items from the electronic calendar application. The CPU 3 may then receive over communication network 61 (e.g., the Internet) calendar items as in block 158. The items may be received as metadata from the Application. The electronic calendar application event may be executed and played at VCS 1 as in block 160. The one or more electronic calendar application events may be to terminate operation of the Application. If the CPU 3 receives instructions to exit the Application as in block 156, then CPU 3 may terminate the session as in block 162.

In one embodiment, text may be displayed on display 4. The text that is displayed may be limited to a predetermined amount (e.g., 12 characters). In one embodiment, the text may be displayed to the user in a "marquee-style." The Application may issue a further instruction in order to accomplish this operation. One example instruction may be "DisplayText (text)" where "text" may represent the text to be displayed on the radio head (not shown) of the CPU 3. In one embodiment, the system may be programmed so that the Application is in focus in order for this instruction to be performed.

In some embodiments, the Application may communicate with a number of executable programs (i.e., dynamic link libraries or DLLs) stored in a module in the ND 53. The DLLs may be used to interface with an application programming interface (API) in order to communicate with the CPU 3. Additionally, the Application may communicate with one or more DLLs for performing World Wide Web (WWW) operations (e.g., based on the .Net architecture developed and distributed by the Microsoft Corporation).

Figure 4:
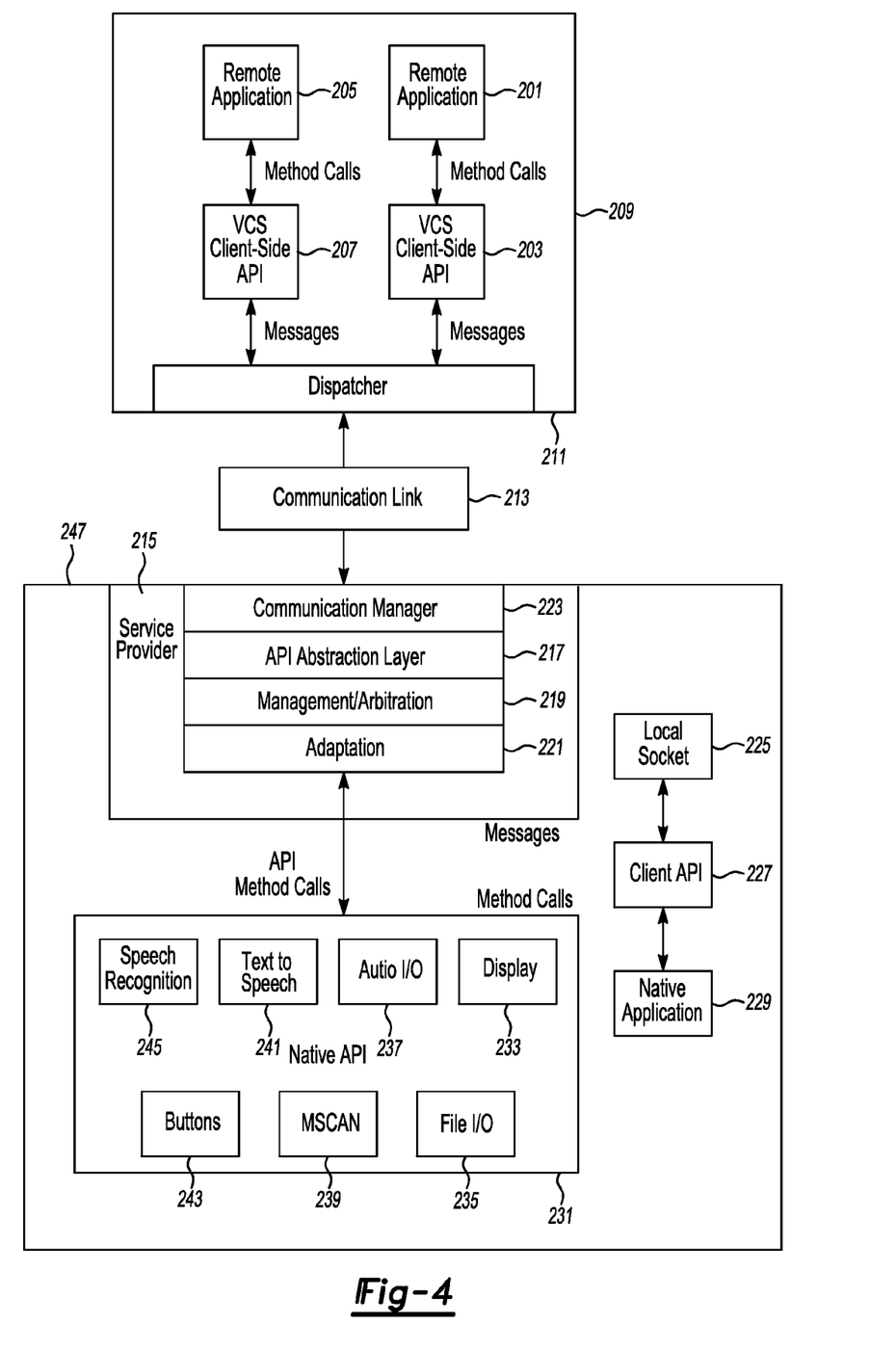
FIG. 4 shows an illustrative exemplary remote device running one or more applications in communication with a vehicle based computing system.

FIG. 4 shows an illustrative exemplary remote device 209 running one or more applications in communication with a vehicle based computing system 247. In this illustrative embodiment, a remote device 209 (e.g., without limitation, a cell phone, PDA, GPS device, etc.) has one or more remote applications 201, 205 stored thereon. The remote applications communicate with the vehicle based computing system 247, using a vehicle computing system (VCS) client side API 203, 207. This API could, for example, be provided to developers in advance, and define the format of outgoing and incoming packets so that communication between the remote device 209 and the vehicle based computing system 247 is possible. A dispatcher 211 can be provided to the remote device 209 if more than one application is communicating at the same time.

Data is passed from the remote device to the vehicle communication system through a communication link 213. This can be a wired or wireless link, and can be half or full duplex. In one illustrative embodiment, the communication is a full duplex communication. In one non-limiting example, the link is a Bluetooth link.

The vehicle system 247 has various applications stored thereon, including, but not limited to: a communications manager 223, an API abstraction application 217, a management and arbitration application 219, and an adaptation application 221 (these applications can also be layers of a single or plurality of applications, such as a service provider application 215).

The communication manager 223 may handle all transports, forwarding incoming messages to the abstraction application (or layer) 217, and ensuring that outgoing messages are sent via the proper transport channel.

The abstraction application 217 may transform incoming messages into action to be performed by a service and create outgoing messages out of information and events from local modules.

The management and arbitration application 219 may virtualize the local vehicle based computing system for each application by managing use of HMI elements and governing resource consumption.

The adaptation application 221 may encapsulate the local API and coexist with core local applications. This application may be modified or replaced to allow a communication connection to be compatible with different versions of the vehicle based computing system software.

In at least one exemplary implementation, a message protocol may be used to encode messages exchanged between a mobile client and the vehicle based computing system to command and control a Human Machine Interface (HMI) for purposes such as displaying and speaking text, listening, propagating button-pushes, etc. These messages may contain small amounts of data (e.g. text phrases, button identifiers, status, thumb-drive file data, configuration data, etc.). This protocol, using complementary support provided by the message specification, will permit multiple client application sessions to concurrently use a single transport channel.

Other open standard protocols may be used where appropriate and available, such as the A2DP BLUETOOTH profile for streaming audio from the mobile device to the vehicle audio system (not all mobile devices support A2DP). However, some open standard protocols are not always available on every mobile device, or are not always implemented uniformly. In addition, API support for use of these protocols may not be uniformly implemented on all mobile platforms. Therefore, the function of some open standard protocols (e.g. OBEX) may be provided as part of the message protocol, when it is technically simple enough to do and a significant increase in uniformity can be achieved across platforms.

Transports may be configured to support full-duplex communication in order to provide prompt event propagation between client applications and the vehicle based computing system. A transport may also support multiple concurrent channels in order to permit concurrent connections from one or more devices.

One or more exemplary transports are Serial (RS232) and TCP/IP. Serial transport communication with mobile devices may be provided, for example, through a BLUETOOTH Serial Profile. Most mobile devices support this profile, and most provide a common programming model for its use. The serial programming model is widely used and highly uniform. If the vehicle based computing system provides Serial-over-USB support, then the Serial transport could be used with any mobile device that is USB-connected to the vehicle based computing system (if that mobile device provides support for Serial over its USB connection).

In addition, a TCP/IP transport provides the ability for applications running on the vehicle based computing system to use the local HMI. If the module provides external TCP/IP connectivity in the future, this transport will allow external clients to connect over that TCP/IP connectivity. The socket programming model (including the API) for TCP/IP is typically highly portable. Such an example would be a locally loaded application 229, using a client-side API 227 to communicate through a local socket 225.

In at least one exemplary embodiment, the decoupled nature of the system, where the vehicle based computing system is unaware of client applications until they connect, demands a discovery mechanism whereby system and the mobile device client can discover each other's existence and capabilities.

Dual discovery is possible, whereby the mobile device client will be able to discover the environment, locale and HMI capabilities of the local platform and the system will be able to discover the applications available on a remote device and have the ability to launch those applications.

In this illustrative embodiment, the native API 231 has various services associated therewith, that can be accessed by remote devices through function calls. For example, a display function 233 may be provided.

The system may provide an API allowing client applications to write to vehicle displays and query their characteristics. The characteristics of each display may be described generically such that client applications will not require hard coding for individual display types (Type 1 FDM, Type 3 GAP, Type 6 Navigation, etc). Specifically, the system may enumerate each display and indicate each display's intended usage (primary or secondary display). Furthermore, the system may enumerate the writable text fields of each display, provide each writable text field's dimensions, and indicate each field's intended general usage. To promote consistency with the current user interface, support for the scrolling of long text may also be included, where permitted by driver distraction rules.

The system may also include text to speech capability 241. The system may provide an API allowing client applications to leverage the vehicle based computing system's text-to-speech functionality. Client applications may also be able to interleave the play of audio icons with spoken text. They may be able to utilize preexisting audio icons or provide short audio files of their own. The format of application provided audio files will be limited to those natively supported.

Further functionality of the illustrative embodiments may include one or more button inputs 243. One example of this would be controlling an application on a remote device through use of buttons installed in a vehicle (such as steering wheel buttons).

Another exemplary function could be a speech recognition function 245. The system may provide an API allowing client applications to leverage the vehicle based computing system's speech recognition capabilities. The system may also simplify the vehicle based computing systems' native speech recognition APIs to provide a simpler development model for client application developers. The speech grammar APIs will also be simplified while retaining most of the native API's flexibility. For example, the system (on behalf of client applications) will recognize global voice commands such as "BLUETOOTH Audio" or "USB" and pass control to the appropriate application.

Audio I/O 237 may also be provided in an exemplary implementation. The system may provide regulated access to the HMI while enforcing the interface conventions that are coded into core applications. A single "in focus" client application may be allowed primary access to the display, buttons, audio capture or speech engine. Client applications without focus (e.g. Text Messaging, Turn By Turn Navigation, etc.) will be allowed to make short announcements (e.g. "New Message Arrived" or "Turn Left"). Stereo audio may continue to play after a mobile device audio application.

The system may provide an API allowing client applications to capture audio recorded using a microphone. The client application may specify duration of the capture, though capture can be interrupted at any time. Captured audio may be returned to the client application or stored on a local or portable drive.

Additionally, file I/O 235 may also be provided with the system. For example, the system may provide an API allowing client applications to read from, write to, create and/or delete files on a remote drive. Access to the remote drive file system may be restricted in that a client application may only read/edit data in a directory specific to that client application.

While the best mode for carrying out the invention has been described in detail, those familiar with the art to which this invention relates will recognize various alternative designs and embodiments for practicing the invention as defined by the following claims.

What is claimed:

1. A computer implemented method comprising:
   establishing wireless communication between a wireless device, executing a calendar application, and a vehicle computing system (VCS);
   receiving a first instruction from the wireless device, instructing the VCS to prompt input relating to a calendar event, including at least appointment playback;
   receiving a second instruction from the wireless device, defining inputs relating to calendar events;
   prompting input based at least in part on the first instruction;
   receiving input relating to the calendar event;
   recognizing the received input based on the defined inputs;
   sending a recognized instruction, including at least an appointment playback play future instruction, instructing execution of playback of all appointments for the day on which the input was received, to the wireless device, instructing execution of a calendar event based at least in part on the recognized input;
   receiving a third instruction from the wireless device, instructing the VCS to output at least one appointment; and
   outputting the at least on appointment in accordance with the third instruction.

2. The method of claim 1, wherein the appointment playback instruction includes a play all instruction, instructing execution of playback of all appointments.

3. The method of claim 1, wherein the appointment playback instruction includes a play today instruction, instructing execution of playback of all appointments for the day on which the input was received.

4. The method of claim 1, wherein the play future instruction further includes a specification of a future timeframe, instructing playback of all appointments for the specified future time frame.

5. The method of claim 1, wherein the at least one calendar event includes appointment modification, wherein the sending further includes sending an appointment modification instruction to the wireless device, instructing execution of appointment modification.

6. The method of claim 1, wherein the at least one calendar event includes appointment deletion, wherein the sending further includes sending an appointment deletion instruction to the wireless device, instructing deletion of an appointment, and wherein the method further includes:
   receiving a fourth instruction from the wireless device, instructing verification of deletion;
   outputting a request for verification of deletion in accordance with the third instruction; and
   upon receipt of verification of deletion responsive to the outputting, sending a verification of deletion response to the wireless device.

7. A non-transitory computer readable storage medium storing instructions that, when executed by the processor of a vehicle computing system, cause the vehicle computing system (VCS) to perform the method comprising:
   establishing wireless communication between a wireless device, executing a calendar application, and the VCS;
   receiving a first instruction from the wireless device, instructing the VCS to prompt input relating to a calendar event;
   receiving a second instruction from the wireless device, defining inputs relating to calendar events;
   prompting input based at least in part on the first instruction;
   receiving input relating to the calendar event;
   recognizing the received input among the defined inputs;
   sending a recognized instruction to the wireless device, including at least an appointment playback play future instruction, instructing execution of playback of all appointments for the day on which the input was received, instructing execution of a calendar event based at least in part on the recognized input;
   receiving a third instruction from the wireless device, instructing the VCS to output at least one appointment; and
   outputting the at least on appointment in accordance with the third instruction.

8. The non-transitory computer readable storage medium of claim 7, wherein the appointment playback instruction includes a play all instruction, instructing execution of playback of all appointments.

9. The non-transitory computer readable storage medium of claim 8, wherein the appointment playback instruction includes a play today instruction, instructing execution of playback of all pending appointments for the day on which the input was received.

10. The non-transitory computer readable storage medium of claim 8, wherein the play future instruction further includes a specification of a future timeframe, instructing playback of all pending appointments for the specified future time frame.

11. The non-transitory computer readable storage medium of claim 7, wherein the at least one calendar event includes appointment modification, wherein the sending further includes sending a verified appointment modification instruction to the wireless device, instructing execution of appointment modification.

12. The non-transitory computer readable storage medium of claim 7, wherein the at least one calendar event includes appointment deletion, wherein the sending further includes sending a verified appointment deletion instruction to the wireless device, instructing deletion of an appointment, and wherein the method further includes:

receiving a fourth instruction from the wireless device, instructing verification of deletion;

outputting a request for verification of deletion in accordance with the third instruction; and upon receipt of verification of deletion responsive to the outputting, sending a verification of deletion response to the wireless device.

13. A computer-implemented method comprising:
   executing a calendar application;
   receiving a first instruction from a vehicle computing system (VCS) in wireless communication with a wireless device, requesting access to the calendar application;
   responsive to the first instruction, sending a first response to the VCS, instructing the VCS to prompt input relating to at least one calendar event;
   responsive to the first instruction, sending a second response to the VCS, defining inputs relating to at least one calendar event;
   receiving a second instruction from the VCS, instructing execution of a calendar event based at least in part on a recognized input, including at least an appointment playback play future instruction, instructing execution of playback of all appointments for the day on which the input was received; and
   executing the instructed calendar event; and
   retrieving one or more calendar appointments corresponding to appointments requested for playback as part of the second instruction; and
   sending a third response to the VCS, instructing playback of the retrieved one or more calendar appointments.

14. The method of claim 13, wherein second instruction includes appointment modification, and wherein the method further comprises:
   modifying at least one designated appointment in accordance with modification instructions included with the second instruction.

15. The method of claim 13, wherein the second instruction includes appointment deletion, and wherein the method further comprises:
   responsive to the second instruction, sending a verification response to the VCS, requesting verification of the second instruction;
   receiving verification of the second instruction; and
   deleting at least one designated appointment in accordance with deletion instructions included with the second instruction.

* * * * *